(No Model.)

C. R. GOODWIN.
GALVANIC BATTERY.

No. 431,742. Patented July 8, 1890.

Witnesses.

Inventor

UNITED STATES PATENT OFFICE.

CHARLES R. GOODWIN, OF PARIS, FRANCE, ASSIGNOR TO THE ELECTRIC GAS LIGHTING COMPANY, OF BOSTON, MASSACHUSETTS.

GALVANIC BATTERY.

SPECIFICATION forming part of Letters Patent No. 431,742, dated July 8, 1890.

Application filed May 14, 1889. Serial No. 310,760. (No model.) Patented in France September 9, 1885, No. 171,105; in Belgium February 20, 1886, No. 72,073, and in England February 25, 1886, No. 2,773.

*To all whom it may concern:*

Be it known that I, CHARLES R. GOODWIN, a citizen of the United States, residing at Paris, in the Republic of France, have invented a new and useful Improvement in Voltaic Batteries, designed for "open-circuit" work, so called, of which the following is a full, clear, and exact description, and for a part of which I have obtained Letters Patent in France, dated September 9, 1885, No. 171,105; in Belgium, dated February 20, 1886, No. 72,073; in Great Britain, dated February 25, 1886, No. 2,773, and made application in the United States, as hereinafter stated.

Figure 1:
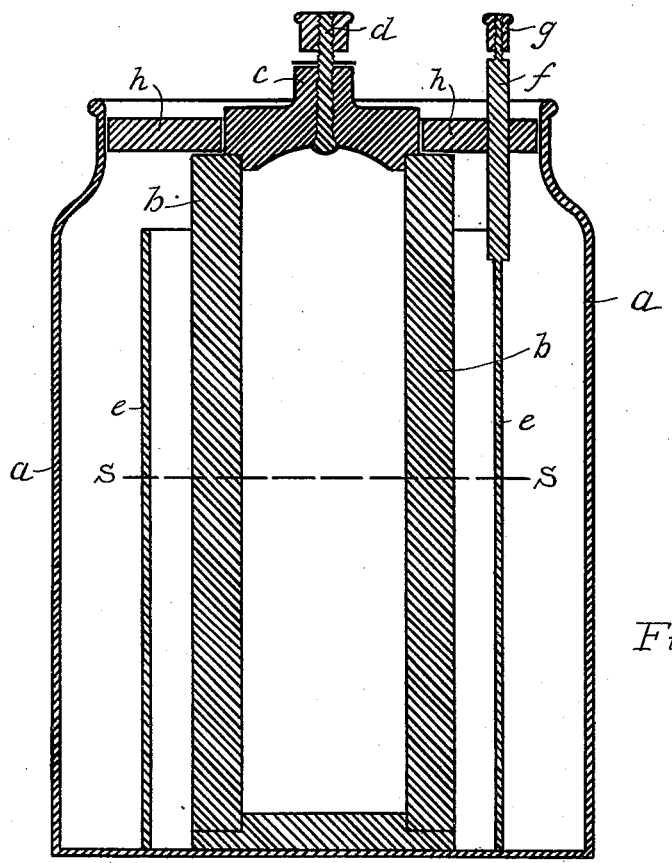
Figure 2:
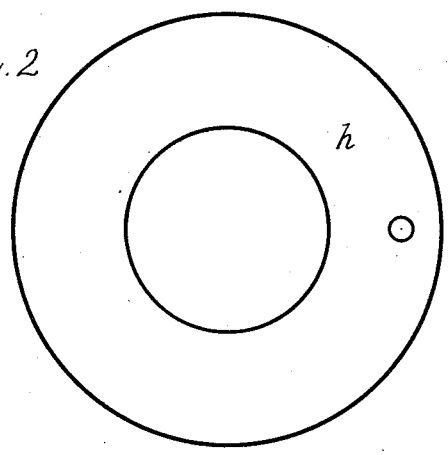
Figure 3:
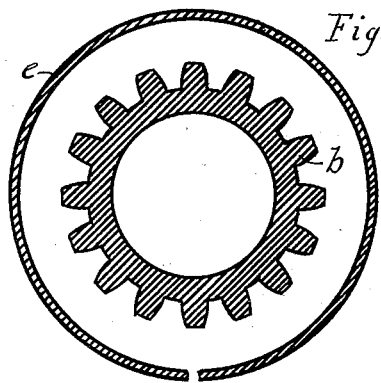

In the accompanying drawings, Figure 1 is a sectional vertical plan showing the outer vessel $a$, containing the exciting-liquid, the porous carbon cup $b$, constituting also the negative element and having the positive pole $c$, with the connecting-screw $d$, and the cylindrical zinc $e$, constituting the positive zinc element and having the top or prolongation and negative pole $f$, with the connecting-screw $g$. Fig. 3 is a sectional plan on line S S, Fig. 1. Fig. 2 is a plan of an acid-proof cover $h$ for vessel $a$, perforated to admit the electrode $f$ and top of the pot $b$.

Similar letters denote similar parts.

My invention has for its purpose to increase the efficiency of an open-circuit or telephone battery by diminishing the internal resistance and by securing a recuperative power after use, thereby securing both a greater working-current and also providing against waste.

My invention consists in first obtaining a porous pot $b$, composed chiefly of hard carbon and wood charcoal or equivalents by mixing pulverized gas or other hard carbon with wood-pulp, or wood sawdust, or equivalents, for the desired purpose, by proper agglomerants, and, after molding the pot, heating the same sufficiently to carbonize the sawdust, whereby I secure a pot of a porous texture, readily permeable by the exciting-liquid, and presenting sufficient surface to enable it also to constitute a good conductor or electrode, as shown in my application for Letters Patent for porous carbon battery pots, filed May 28, 1886, Serial No. 203,503. This pot I form with a bottom and a top to constitute also the positive pole, and place within it, preferably, peroxide of manganese with hard carbon. The exterior surface of the pot is preferably fluted, as shown in cross-section, Fig. 3, to increase its contact-surface. I surround this pot with a straight cylindrical zinc $e$, formed to leave a space of about one-quarter of an inch in its periphery, and provided with the projection or electrode $f$, so constituted as to pierce the non-conducting cover $h$ of the jar $a$ and assist to steady the elements. My connecting-rod for the carbon electrode consists of a brass rod and screw, the half of which nearest the head is coated with peroxide of lead to avoid corrosion and seal the joint, and is inserted through the top carrying the electrode $c$, so that the end screw will project to receive the binding-cap. After baking I also dip the upper part of the pot and electrode— say about one inch—while hot, in paraffine, which is absorbed by the pores, so as to insure freedom from exudations from the action of the exciting-liquid. This manner of making the connections and of treating the top with paraffine keeps the battery free from crystallization and in a cleanly working condition. As an exciting-liquid, I use, preferably, a solution of sal-ammoniac.

Having described my invention, I disclaim herein, in favor of my application before referred to, the method of forming the porous carbon and the porous carbon as a product, and claim—

1. The porous carbon cell composed of finely-divided hard carbon, a carbonized agglomerant, and particulate or fibrous organic matter reduced to charcoal, combined substantially as described.

2. An open-circuit or telephone battery comprising one or more cells, each cell comprising a porous pot composed of hard carbon, particulate or fibrous carbon, and a carbonized agglomerant, a zinc in proximity to the porous carbon pot, and a jar to receive the porous pot and zinc, substantially as set forth.

3. The combination, with the porous pot, as described, of the connecting-screw $d$, coated with peroxide of lead before insertion, substantially as described.

CHAS. R. GOODWIN.

Witnesses:
    VLATER,
    D'ESTAINVILLE.